(12) United States Patent  
Singer

(10) Patent No.: US 11,726,182 B2  
(45) Date of Patent: Aug. 15, 2023

(54) MULTIPLE BEAM, SINGLE MEMS LIDAR

(71) Applicant: GM GLOBAL TECHNOLOGY OPERATIONS LLC, Detroit, MI (US)

(72) Inventor: Scott Singer, San Gabriel, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1325 days.

(21) Appl. No.: 16/158,266

(22) Filed: Oct. 11, 2018

(65) Prior Publication Data

US 2020/0116832 A1 Apr. 16, 2020

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4865* (2013.01); *G01S 17/26* (2020.01); *G01S 17/32* (2013.01);
(Continued)

(58) Field of Classification Search
CPC .... G01S 7/4808; G01S 7/4811; G01S 7/4814; G01S 7/4815; G01S 7/4817; G01S 7/4865; G01S 17/26; G01S 17/32; G01S 17/89; G01S 17/931; G01S 7/4818; G01S 17/42; G02B 26/0833; G02B 26/101; G02B 26/123

See application file for complete search history.

(56) References Cited

U.S. PATENT DOCUMENTS 6,061,001 A 5/2000 Sugimoto
6,075,636 A * 6/2000 Sekikawa ............ G02B 26/123
359/204.1

(Continued)

FOREIGN PATENT DOCUMENTS

CN 106093911 A * 11/2016 ............ G01S 17/89
CN 108445469 A * 8/2018
(Continued)

OTHER PUBLICATIONS

Yoo, H.W., Druml, N., Brunner, D. et al. MEMS-based lidar for autonomous driving. Elektrotech. Inftech. 135, 408-415 (Published Jul. 31, 2018). https://link.springer.com/article/10.1007/s00502-018-0635-2#citeas (Year: 2018).*

(Continued)

*Primary Examiner* — Samantha K Nickerson
(74) *Attorney, Agent, or Firm* — Calfee, Halter & Griswold LLP

(57) ABSTRACT

Various technologies described herein pertain to multiple beam, single mirror lidar. A multiple beam, single mirror lidar system can include a 2D MEMS mirror and a photonic integrated circuit. The photonic integrated circuit includes a plurality of lidar channels, each including a transmitter and a receiver. In the photonic integrated circuit, the lidar channels are directed at a common point on the 2D MEMS mirror. The lidar channels are oriented with relative offset angles. Thus, the lidar channels output beams that are directed at the common point on the 2D MEMS mirror and are oriented with relative offset angles.

20 Claims, 13 Drawing Sheets

(51) Int. Cl.
  *G01S 17/26* (2020.01)
  *G01S 7/4865* (2020.01)
  *G01S 17/32* (2020.01)
  *G02B 26/08* (2006.01)
  *G02B 26/12* (2006.01)

(52) U.S. Cl.
  CPC ....... *G02B 26/0833* (2013.01); *G02B 26/123* (2013.01)

(56) References Cited

U.S. PATENT DOCUMENTS

| | | | |
|---|---|---|---|
| 7,209,271 B2 | 4/2007 | Lewis et al. | |
| 9,805,603 B2 | 10/2017 | Kim et al. | |
| 2003/0184835 A1* | 10/2003 | Goldberg | G02B 26/123 359/204.1 |
| 2004/0104837 A1 | 6/2004 | Samukawa et al. | |
| 2006/0006337 A1 | 1/2006 | Kane | |
| 2013/0201052 A1 | 8/2013 | Saint Clair et al. | |
| 2015/0318952 A1* | 11/2015 | Butrie | H04B 10/503 398/139 |
| 2015/0378187 A1* | 12/2015 | Heck | G02B 6/12 250/227.21 |
| 2016/0161685 A1* | 6/2016 | Xu | G02B 6/4204 385/14 |
| 2018/0143322 A1* | 5/2018 | Rosenzweig | G08G 1/04 |
| 2018/0231640 A1 | 8/2018 | Han et al. | |
| 2018/0267151 A1* | 9/2018 | Hall | G01S 17/10 |

FOREIGN PATENT DOCUMENTS

| | | | | |
|---|---|---|---|---|
| DE | 202017105001 U1 | * | 10/2017 | .......... B81B 7/0067 |
| JP | H1195133 A | * | 6/1998 | |
| JP | 2004219480 A | * | 8/2004 | .......... G02B 26/123 |
| JP | 2015135424 A | * | 7/2015 | .............. B41J 2/451 |
| WO | WO-2012099151 A1 | * | 7/2012 | .............. G01B 11/24 |
| WO | WO-2014168137 A1 | * | 10/2014 | .............. G01S 17/42 |
| WO | WO-2018160729 A2 | * | 9/2018 | .............. G01S 17/18 |

OTHER PUBLICATIONS

"International Search Report for PCT Patent Application No. PCT/US2019/055587", dated Jan. 15, 2020, 4 Pages.

"Written Opinion of the International Searching Authority for PCT Patent Application No. PCT/US2019/055587", dated Jan. 15, 2020, 7 Pages.

"International Preliminary Report on Patentablility for PCT Patent Application No. PCT/US2019/055587", dated Apr. 8, 2021, 8 Pages.

* cited by examiner

MULTIPLE BEAM, SINGLE MEMS LIDAR

BACKGROUND

Light detection and ranging (lidar) systems are surveying systems that measure distance to a target in an environment by illuminating the target with laser light and measuring reflected light (lidar return). Differences in laser return times and wavelengths can be utilized to generate a three-dimensional (3D) representation of the target. Lidar systems can be used in various terrestrial, airborne, and mobile applications; for instance, lidar systems can be employed in autonomous or semi-autonomous vehicles, drones, robotics, and other applications that utilize laser scanning capabilities.

One type of lidar system is a direct time-of-flight (TOF) lidar system. A direct TOF lidar system emits short pulses of light, such that the pulses of light can reflect off a target in an environment, assuming a target is at a position in the environment towards which the pulses of light are directed. The direct TOF lidar system can receive reflected pulses (e.g., the pulses of light that reflect off the target, if any). A delay between transmission and reception can be utilized to determine a distance between the direct TOF lidar system and the target. The direct TOF lidar system may also determine a velocity of the target by comparing two frames of data; assuming that the target is identified in two frames captured at differing times, a change in the position of the target over time can be utilized to determine the velocity of the target.

Another type of lidar system is a frequency-modulated continuous wavelength (FMCW) lidar system. A FMCW lidar system can include a laser source that generates a frequency-modulated optical signal that includes a continuous series of optical chirps, where an instantaneous frequency within each chirp varies with time. A transmitter of the FMCW lidar system transmits the optical chirps across an environment. Moreover, a receiver of the FMCW lidar system can receive the optical chirps that reflect off a target located in the environment, if any. Measurement of a frequency shift and/or a phase shift of each reflected optical chirp relative to a reference optical chirp can provide a measure of a distance and/or a velocity of the target relative to the FMCW lidar system.

Some conventional lidar systems (e.g., some conventional direct TOF lidar systems, some conventional FMCW lidar systems) utilize two-dimensional (2D) micro-electro-mechanical systems (MEMS) mirrors that can be oriented to view a part of a target field of view. 2D MEMS mirrors can be advantageous in lidar systems since the 2D MEMS mirrors can have small form factors while providing improved reliability, higher scanning speed (e.g., greater than 5000 degrees per second), and improved scalability relative to some other conventional lidar systems that do not use 2D MEMS mirrors. However, traditional lidar systems that include 2D MEMS mirrors oftentimes have limited scanning ranges relative to other conventional lidar systems. Since a field of view of a lidar system that includes a 2D MEMS mirror is set by a scanning range of the 2D MEMS mirror, MEMS-based scanning lidars may have limited fields of view. Accordingly, to achieve sufficient angular coverage (e.g., such as 360 degrees around an autonomous vehicle in a horizontal direction), multiple conventional lidar systems oftentimes are employed to provide the desired angular coverage. For example, if a conventional lidar system that includes a 2D MEMS mirror has a field of view of 60 degrees in a horizontal direction (azimuthal direction) and 40 degrees in a vertical direction (elevation direction), then at least six of the conventional lidar systems would need to be utilized in combination for an autonomous vehicle to provide 360 degree azimuthal coverage around the autonomous vehicle.

Moreover, a pixel rate of a single lidar system may be limited by a time of flight to a farthest target the lidar system is designed to detect ($R_{max}$). For example, a transmitter/receiver pair of a conventional direct TOF lidar system can produce up to $c/2R_{max}$ pixels per second. According to another example, a transmitter/receiver pair of a conventional FMCW lidar system that additionally returns Doppler velocity can produce up to $c/4R_{max}$ pixels per second (assuming a symmetric triangle wave modulation is utilized). In the foregoing, c is the speed of light. According to an illustration, an FMCW lidar system with a single transmitter/receiver pair designed to see up to 300 meters ($R_{max}$=300 meters) can, at most, return approximately 250,000 pixels per second. This physical limit causes a tradeoff between frame rate and angular resolution of the frame due to the interrelation between the frame rate and the angular resolution. For instance, assuming equal spacing between pixels, a pixel rate can be approximated as pixel rate=frame rate*(horizontal field of view/horizontal resolution)*(vertical field of view/vertical resolution). Thus, conventional lidar systems that include 2D MEMS mirrors may have limited frame rates and/or angular resolutions in addition to having limited fields of view.

SUMMARY

The following is a brief summary of subject matter that is described in greater detail herein. This summary is not intended to be limiting as to the scope of the claims.

Described herein are various technologies that pertain to multiple beam, single mirror lidar. A multiple beam, single mirror lidar system can include a two-dimensional (2D) micro-electro-mechanical systems (MEMS) mirror. Moreover, the multiple beam, single mirror lidar system can include a photonic integrated circuit. The photonic integrated circuit includes a plurality of lidar channels; for instance, the photonic integrated circuit can include a first lidar channel and a second lidar channel. The first lidar channel can include a first transmitter and a first receiver, and the second lidar channel can include a second transmitter and a second receiver. In the photonic integrated circuit, the first lidar channel and the second lidar channel can be directed at a common point on the 2D MEMS mirror. The first lidar channel and the second lidar channel can also be oriented with a relative offset angle. Thus, the first lidar channel (e.g., the first transmitter) can output a first beam and the second lidar channel (e.g., the second transmitter) can output a second beam; the first beam and the second beam outputted by the photonic integrated circuit are directed at the common point on the 2D MEMS mirror and are oriented with the relative offset angle. While many of the examples set forth herein describe the photonic integrated circuit having two lidar channels, it is to be appreciated that these examples can be extended to the photonic integrated circuit having three or more lidar channels. Moreover, while many of the examples set forth herein describe a multiple beam, single mirror lidar system that includes a photonic integrated circuit (where the photonic integrated circuit includes various elements), it is contemplated that discrete elements (described herein as being included as part of a photonic integrated circuit) can replace the photonic integrated circuit in other embodiments.

According to various embodiments, the photonic integrated circuit can further include waveguides that are configured to guide beams from transmitters of the lidar channels towards the 2D MEMS mirror. Moreover, the waveguides are configured to guide lidar returns from the 2D MEMS mirror to the receivers of the lidar channels. For instance, the photonic integrated circuit can include a first waveguide and a second waveguide. The first waveguide can be configured to guide the first beam from the first transmitter directed towards the common point on the 2D MEMS mirror. Moreover, the second waveguide can be configured to guide the second beam from the second transmitter directed towards the common point on the 2D MEMS mirror. The first beam and the second beam can be incident on the 2D MEMS mirror at the common point with the relative offset angle; thus, the first beam from the first transmitter and the second beam from the second transmitter can exit the photonic integrated circuit directed towards the common point on the 2D MEMS mirror at the relative offset angle. Again, it is contemplated that the photonic integrated circuit can include more than two lidar channels, and thus, can include more than two sets of waveguides. Pursuant to an example, the waveguides can be formed by a material, such as silicon (Si), silicon dioxide (SiO2), silicon nitride (Si3N4), gallium arsenide (GaAs), indium phosphide (InP), lithium nitrate (LiNO3), or the like, on a substrate material, such as Si, GaAs, InP, etc.

Pursuant to various embodiments, the photonic integrated circuit can include a single laser source. In such embodiments, the single laser source can be configured to generate an optical input. Moreover, the photonic integrated circuit can include a splitter, where the splitter is configured to split the optical input for the lidar channels of the photonic integrated circuit. Thus, if the photonic integrated circuit includes the first lidar channel and the second lidar channel, the splitter can split the optical input for the first lidar channel and the second lidar channel.

According to other embodiments, the photonic integrated circuit can include separate laser sources for the lidar channels. By way of example, if the photonic integrated circuit includes two lidar channels (e.g., the first lidar channel and the second lidar channel), then the photonic integrated circuit can include two separate laser sources (e.g., a first laser source and a second laser source). Following this example, the first laser source can be configured to generate a first optical input for the first lidar channel, and the second laser source can be configured to generate a second optical input for the second lidar channel.

As described herein, utilizing multiple lidar channels oriented such that beams are incident on a shared 2D MEMS mirror at differing offset angles enables providing a lidar system with enhanced field of view, angular resolution, and/or frame rate as compared to conventional lidar systems. Moreover, the multiple beam, single mirror lidar system may include fewer elements and be less complex as compared to a lidar system that duplicates elements of a conventional 2D MEMS lidar system (e.g., a single 2D MEMS mirror can be utilized in the multiple beam, single mirror lidar system to reduce cost and complexity).

It is to be appreciated that a multiple beam, single mirror lidar system as described herein can be included in an autonomous vehicle. However, it is also contemplated that such a multiple beam, single mirror lidar system can be utilized in a semi-autonomous vehicle, a drone, or substantially any type of application that utilizes laser scanning capabilities.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
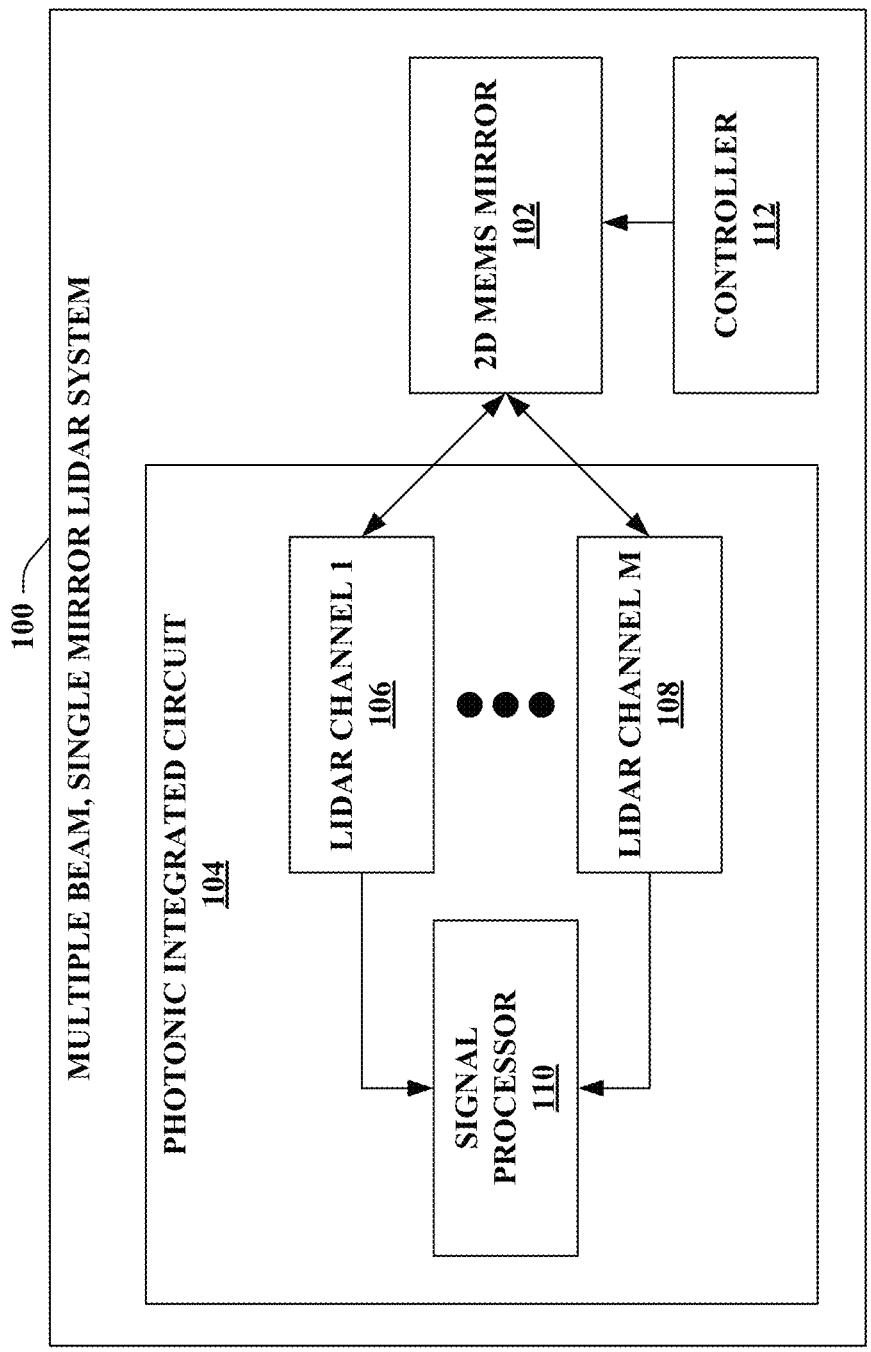
FIG. 1 illustrates a functional block diagram of an exemplary multiple beam, single mirror lidar system.

Various technologies pertaining to multiple beam, single mirror lidar are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Referring now to the drawings, FIG. 1 illustrates an exemplary multiple beam, single mirror lidar system 100. The multiple beam, single mirror lidar system 100 includes a two-dimensional (2D) micro-electro-mechanical systems (MEMS) mirror 102. Moreover, the multiple beam, single mirror lidar system 100 can include a photonic integrated circuit 104. The photonic integrated circuit 104 includes a plurality of lidar channels; more particularly, the photonic integrated circuit 104 includes a lidar channel 1 106, . . . , and a lidar channel M 108, where M can be substantially any integer greater than one (collectively referred to herein as lidar channels 106-108).

Figure 3:
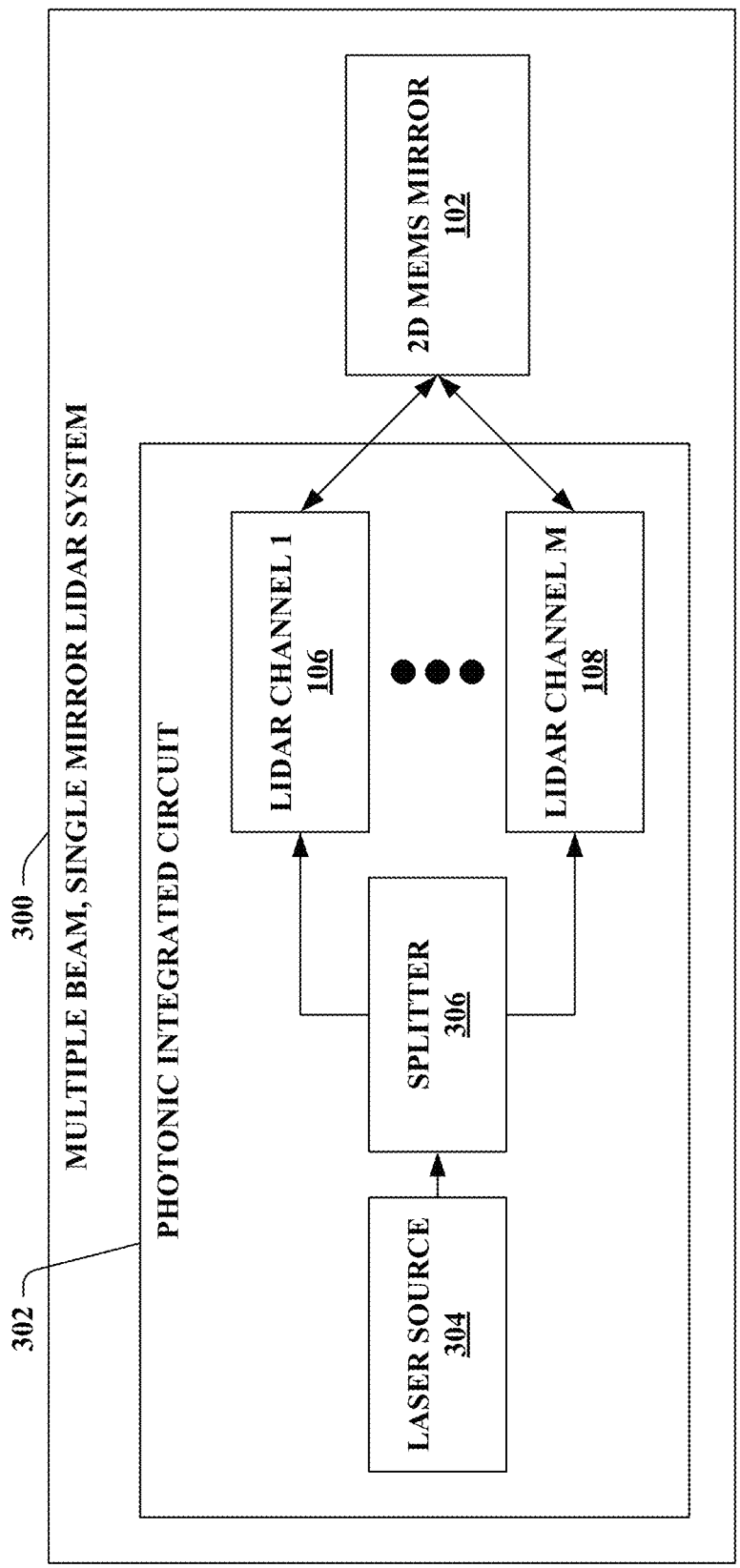
FIG. 3 illustrates a functional block diagram of an exemplary multiple beam, single mirror lidar system that includes a single laser source.
Figure 6:
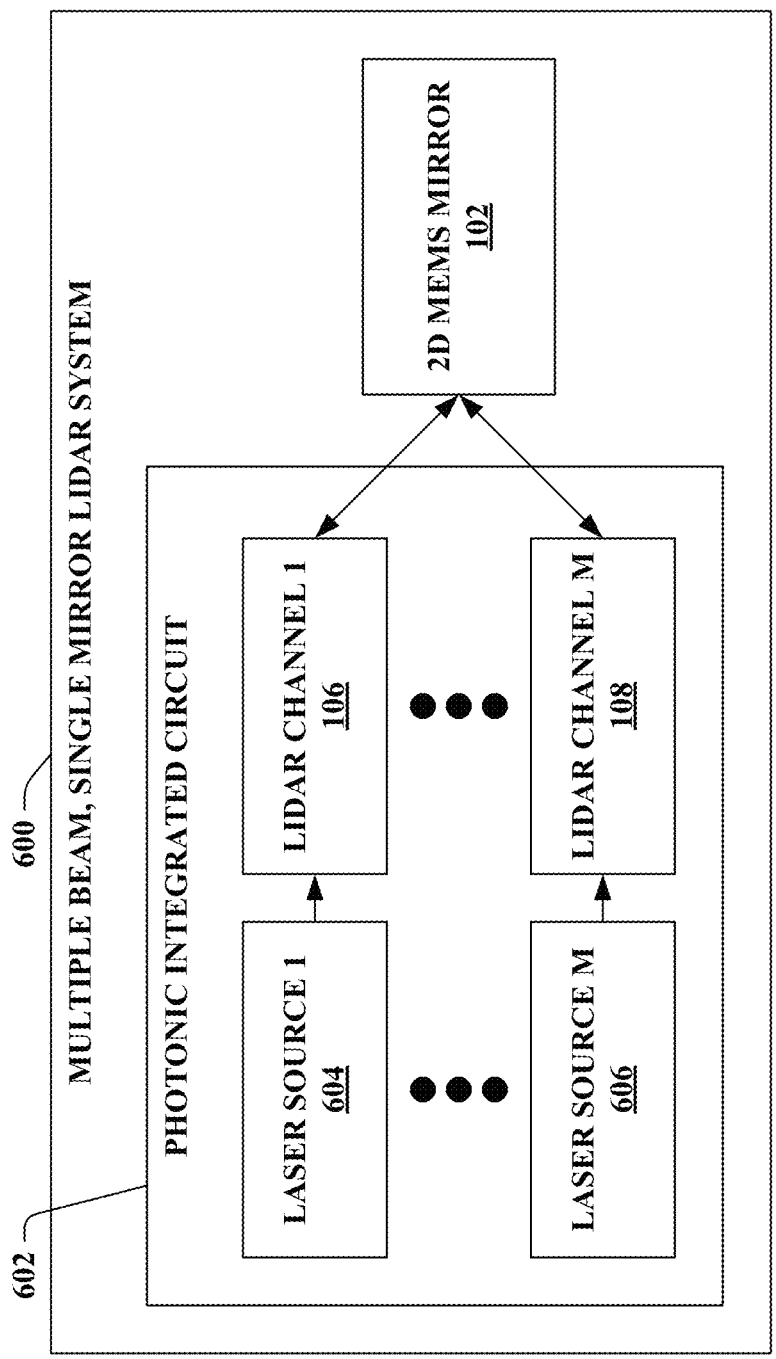
FIG. 6 illustrates a functional block diagram of an exemplary multiple beam, single mirror lidar system that includes multiple laser sources.

Each of the lidar channels 106-108 includes a transmitter and a receiver. Thus, for instance, the lidar channel 1 106 includes a first transmitter and a first receiver, and the lidar channel M 108 includes a second transmitter and a second receiver; likewise, if there are more than two lidar channels, the additional lidar channels can each include a corresponding transmitter and receiver. A transmitter of a lidar channel (e.g., the first transmitter of the lidar channel 1 106, the second transmitter of the lidar channel M 108, etc.) can include optical elements (e.g., one or more lenses, an optical isolator, a resonator, an optical amplifier, an interferometer) for generating a beam with desired properties such as collimation, divergence angle, linewidth, power, and the like. Although not show in FIG. 1, a single laser source (as depicted in FIG. 3) or a plurality of separate laser sources (as depicted in FIG. 6) can generate optical inputs for the transmitters of the lidar channels 106-108. A beam outputted by a transmitter can include pulses of laser light (e.g., the multiple beam, single mirror lidar system 100 is a direct TOF lidar system) or a continuous series of optical chirps (e.g., the multiple beam, single mirror lidar system 100 is a FMCW lidar system). Moreover, a receiver of a lidar channel (e.g., the first receiver of the lidar channel 1 106, the second receiver of the lidar channel M 108, etc.) can receive lidar returns (e.g., captured waveforms or chirps that reflect off of a target in an environment) and convert the lidar returns into electrical signals.

The lidar channels 106-108 can be directed at a common point on the 2D MEMS mirror 102 and can be oriented with relative offset angles there between (e.g., the lidar channel 1 106 and the lidar channel M 108 can be directed at the common point on the 2D MEMS mirror 102 and can be oriented with a relative offset angle). The photonic integrated circuit 104 is configured to output a plurality of beams. For instance, the lidar channel 1 106 can output a first beam and the lidar channel M 108 can output a second beam. The beams outputted by the photonic integrated circuit 104 (e.g., outputted by the transmitters of the lidar channels 106-108) can be incident on the 2D MEMS mirror 102 at differing angles. Moreover, lidar returns can reflect off of the 2D MEMS mirror 102 at the differing angles; the reflected lidar returns can be received by receivers of the lidar channels 106-108.

The lidar channels 106-108 can be directed at the common point on the 2D MEMS mirror 102 with the relative offset angles by waveguides on the photonic integrated circuit, for example. Following this example, beams transmitted by the transmitters of the lidar channels 106-108 can traverse through the waveguides and exit the photonic integrated circuit 104; when exiting the photonic integrated circuit 104, the beams can be directed at the common point on the 2D MEMS mirror 102 and oriented with the relative offset angles there between. Pursuant to another example, beams transmitted by the transmitters of the lidar channels 106-108 can exit the photonic integrated circuit 104; optical element(s) separate from the photonic integrated circuit 104 (e.g., mirrors external to the photonic integrated circuit 104) can be utilized to direct the beams to the common point on the 2D MEMS mirror 102 with the relative offset angles.

Pursuant to an example, the multiple beam, single mirror lidar system 100 can be a direct TOF lidar system (e.g., the photonic integrated circuit 104 can include one or more direct TOF laser sources). Following this example, the beams outputted by the transmitters of the lidar channels 106-108 can include pulses of laser light. According to another example, the multiple beam, single mirror lidar system 100 can be a FMCW lidar system (e.g., the photonic integrated circuit 104 can include one or more FMCW laser sources). Following this example, the beams outputted by the transmitters of the lidar channel 106-108 can include a continuous series of optical chirps.

The multiple beam, single mirror lidar system 100 can further include a signal processor 110. As shown in FIG. 1, the photonic integrated circuit 104 can include the signal processor 110. However, according to another example, it is to be appreciated that the signal processor 110 can be separate from the photonic integrated circuit 104 (e.g., the signal processor can be on an integrated circuit that is separate from the photonic integrated circuit 104). The signal processor 110 can receive electrical signals from the receivers of the lidar channels 106-108 and can derive distance(s) to the target(s) in the environment that reflect the beams (e.g., transmitted by the transmitters of the multiple beam, single mirror lidar system 100).

The multiple beam, single mirror lidar system 100 can further include a controller 112 that can control movement of the 2D MEMS mirror 102. For instance, the controller 112 can cause the 2D MEMS mirror 102 to tilt in an azimuthal direction and/or an elevation direction. It is contemplated that the photonic integrated circuit 104 can include the controller 112, the 2D MEMS mirror 102 can include the controller 112, the controller 112 can be separate from the photonic integrated circuit 104 and the 2D MEMS mirror 102, or a combination thereof.

The 2D MEMS mirror 102 is utilized to reflect light out from the multiple beam, single mirror lidar system 100 (e.g., transmit the beams into an environment) as well as receive light at the multiple beam, single mirror lidar system 100 (e.g., receiver the lidar returns from the environment). Accordingly, the 2D MEMS mirror 102 can be an optical aperture for the multiple beam, single mirror lidar system 100. Pursuant to an example, the 2D MEMS mirror 102 can have a diameter within the range of 1 millimeter to 15 millimeters (inclusive) (e.g., the 2D MEMS mirror 102 can have a diameter of approximately 5 millimeters); yet, it is contemplated that other diameters are intended to fall within the scope of the hereto appended claims.

As described herein, a photonic integrated circuit (e.g., the photonic integrated circuit 104) can include a monolithic substrate. Elements described as being included as part of a photonic integrated circuit can be formed, built, installed, or otherwise integrated on the monolithic substrate. Thus, for instance, optical elements of lidar channels, laser source(s), waveguides, a signal processor, a splitter, a combination thereof, etc. can be integrated on a photonic integrated circuit.

As described herein, multiple transmitters and receivers (e.g., the lidar channels 106-108) can be grown and integrated on a single photonic integrated circuit without additional lithography or processing steps relative to a photonic integrated circuit with a single lidar channel. By utilizing a photonic integrated circuit described herein with available multichannel processing electronics, a scanning lidar system-on-chip with an extended field of view, enhanced resolution, enhanced and/or enhanced frame rate may be achieved while minimizing complexity of such system. Moreover, each of the lidar channels 106-108 can cover a corresponding field of view; thus, the photonic integrated circuit 104 can cover the multiple fields of view of the lidar channels 106-108 without cross-interference between the lidar channels 106-108 utilizing a single controller 112. According to various embodiments, it is also contemplated that the photonic integrated circuit 104 can include a single resonator; however, the claimed subject matter is not so limited.

Utilizing the multiple lidar channels 106-108 oriented such that beams are incident on the shared 2D MEMS mirror 102 at differing offset angles enables providing a lidar system with enhanced field of view, angular resolution, and/or frame rate as compared to conventional lidar systems. Moreover, the multiple beam, single mirror lidar system 100 may include fewer elements and be less complex as compared to a lidar system that duplicates elements of a conventional 2D MEMS lidar system (e.g., a single 2D MEMS mirror can be utilized in the multiple beam, single mirror lidar system to reduce cost and complexity). Further, according to an example where a single laser source is employed, it follows that even fewer elements can be duplicated as compared to a lidar system that duplicates the elements of a conventional 2D MEMS lidar system.

While many of the examples set forth herein describe a multiple beam, single mirror lidar system that includes a 2D MEMS mirror (e.g., the 2D MEMS mirror 102), it is contemplated that these examples can be extended to non-MEMS reflecting 2D analog scanners, such as mirror galvanometers.

Moreover, while many of the examples set forth herein describe a multiple beam, single mirror lidar system (e.g., the multiple beam, single mirror lidar system 100) including a photonic integrated circuit (e.g., the photonic integrated circuit 104), in other embodiments it is contemplated that the photonic integrated circuit that includes the various elements described herein can instead be replaced by discrete elements. For instance, the lidar channels 106-108 and the signal processor 110 can be discrete elements in the multiple beam, single mirror lidar system 100 in accordance with other embodiments.

Figure 2:
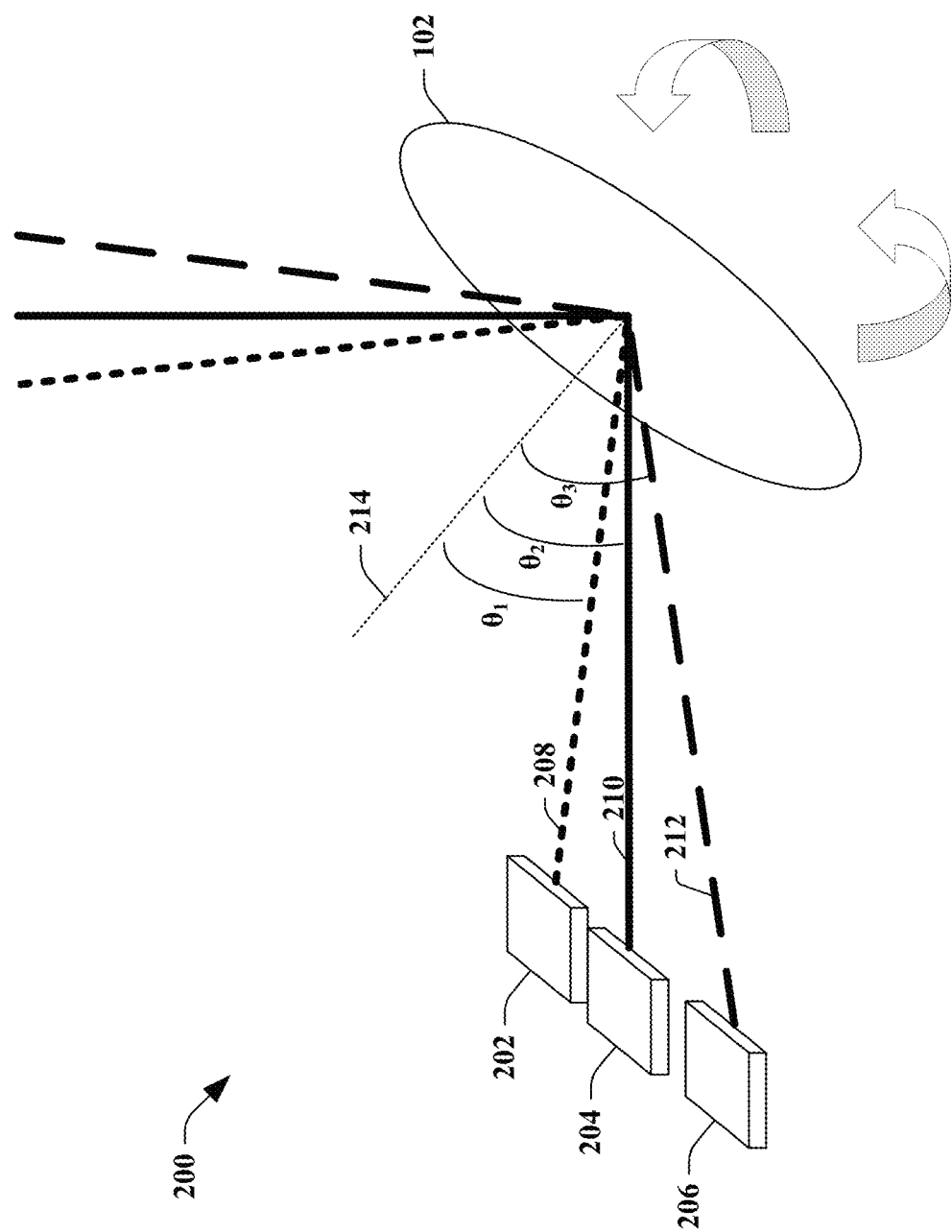
FIG. 2 illustrates an exemplary multiple beam, single mirror lidar system that includes three lidar channels.

Turning to FIG. 2, illustrated is an exemplary multiple beam, single mirror lidar system 200 that includes three lidar channels (e.g., the multiple beam, single mirror lidar system 100 of FIG. 1 with three lidar channels). More particularly, the system 200 includes the 2D MEMS mirror 102 as well as a first lidar channel 202, a second lidar channel 204, and a third lidar channel 206 (collectively referred to herein as lidar channels 202-206) (e.g., the lidar channels 202-206 can be the lidar channels 106-108 of FIG. 1). Again, as noted above, it is contemplated that the multiple beam, single mirror lidar system 200 can include two lidar channels or more than three lidar channels. Further, although not depicted in FIG. 2, it is contemplated that a photonic integrated circuit (e.g., the photonic integrated circuit 102) can include the lidar channels 202-206; yet, the claimed subject matter is not so limited.

In the example shown in FIG. 2, the lidar channels 202-206 are oriented to direct beams at a common point on the 2D MEMS mirror 102. In particular, a transmitter of the lidar channel 202 can output a beam 208, a transmitter of the lidar channel 204 can output a beam 210, and a transmitter of the lidar channel 206 can output a beam 212 (the beam 208, the beam 210, and the beam 212 are collectively referred to herein as beams 208-212). The beam 208 is incident on the 2D MEMS mirror 102 at an angle $\theta_1$ with respect to a normal 214 to a surface of the 2D MEMS mirror 102. Moreover, the beam 210 is incident on the 2D MEMS mirror 102 at an angle $\theta_2$ with respect to the normal 214 to the surface of the 2D MEMS mirror 102. Likewise, the beam 212 is incident on the 2D MEMS mirror 102 at an angle $\theta_3$ with respect to the normal 214 to the surface of the 2D MEMS mirror 102. The beams 208-212 transmitted by the transmitters of the lidar channels 202-206 reflect off of the 2D MEMS mirror 102; due to the law of reflection, the beams 208-212 reflect at angles $\theta_1$, $\theta_2$, and $\theta_3$, respectively, with respect to the normal 214 to the surface of the 2D MEMS mirror 102.

As noted above, the beams 208-212 are incident on the 2D MEMS mirror 102 with relative offset angles. The relative offset angles between the beams 208-212 can be fixed. A relative offset angle between the beam 208 outputted by the transmitter of the lidar channel 202 and the beam 210 outputted by the transmitter of the lidar channel 204, both incident and reflected by the 2D MEMS mirror 102, is $abs(\theta_2-\theta_1)$ in a plane formed by the two beams (the beam 208 and the beam 210). Further, a relative offset angle between the beam 210 outputted by the transmitter of the lidar channel 204 and the beam 212 outputted by the transmitter of the lidar channel 206, both incident and reflected by the 2D MEMS mirror 102, is $abs(\theta_3-\theta_2)$ in a plane formed by the two beams (the beam 210 and the beam 212). According to an example, a relative offset angle can be between 0 degrees and 30 degrees mechanical (between 0 degrees and 60 degrees optical) (e.g., the relative offset angle between adjacent beams such as between the beam 208 and the beam 210 or between the beam 210 and the beam 212 in the depicted example); however, the claimed subject matter is not so limited.

The 2D MEMS mirror 102 is a two-dimensional analog mirror. Accordingly, the 2D MEMS mirror 102 may be actuated to mechanically tilt at any angle up to a maximum tilt angle in any combination of two directions. For example, a maximum tilt in a horizontal direction (azimuthal direction) x can be $x_{max}$ and a maximum tilt in a vertical direction (elevation direction) y can be $y_{max}$. Following this example, the 2D MEMS mirror 102 can tilt to any combination of a horizontal angle between $-x_{max}$ and $+x_{max}$ and a vertical angle between $-y_{max}$ and $+y_{max}$.

Moreover, it is to be appreciated that $\theta_1$ need not be solely within the x-z plane or the y-z plane; thus, $\theta_1$ may be decomposed into components $\theta_{x1}$ and $\theta_{y1}$. Likewise, $\theta_2$ and $\theta_3$ need not be solely within the x-z or y-z planes. By actuating the 2D MEMS mirror 102 to a 2D tilt of $\alpha_x$ and $\alpha_y$, an angle of the outgoing beam 208 from the transmitter of the lidar channel 202 relative to an angle of the beam 208 with the 2D MEMS mirror 102 in a neutral position shifts by $2*\alpha_x$ and $2*\alpha_y$ (neglecting any optical distortion). Moreover, the same shift applies to the beam 210 from the transmitter of the lidar channel 204 and the beam 212 from the transmitter of the lidar channel 206. Accordingly, actuating the 2D MEMS mirror 102 to cause a change in the tilt shifts the beams 208-212 by the same angle, but the relative offset angles between the beams 208-212 remains invariant regardless of the tilt of the 2D MEMS mirror 102.

Accordingly, the 2D MEMS mirror 102 is actuatable to mechanically tilt in both the azimuthal direction and the elevation direction (e.g., as controlled by the controller 112 of FIG. 1). Thus, a first beam from a first transmitter (e.g., the beam 208 from the transmitter of the lidar channel 202) that reflects off of the 2D MEMS mirror 102 forms a first scan pattern and a second beam from a second transmitter (e.g., the beam 210 from the transmitter of the lidar channel 204) that reflects off of the 2D MEMS mirror 102 forms a second scan pattern. The first scan pattern and the second scan pattern are shifted with respect to each other based on the relative offset angle. According to an example, at least portions of the first scan pattern and the second scan pattern can be non-overlapping. Additionally or alternatively, at least portions of the first scan pattern and the second scan pattern can be overlapping. Thus, the actuating of the 2D MEMS mirror 102 to mechanically tilt can allow for forming two-dimensional scan patterns. Because of the invariance in the relative offset angles, transmitters of the lidar channels 202-206 can generate identical scan patterns that are shifted by the relative offset angles. For instance, the scan pattern generated by the beam 208 from the lidar channel 202 can be abs($\theta_2-\theta_1$) away from the scan pattern generated by the beam 210 from the lidar channel 204 in the direction of the common plane. The 2D MEMS mirror 102 may be actuated to form substantially any pattern within a maximal field of view of the 2D MEMS mirror 102, which can cover an angle of $4*x_{max}$ by $4*y_{max}$. According to an example, $x_{max}=15$ degrees and $y_{max}=10$ degrees; following this example, the 2D MEMS mirror 102 can be actuated to support a scan pattern up to 60 degrees by 40 degrees optical (e.g., the scan pattern generated by the beam 208 can be up to 60 degrees by 40 degrees optical, the scan pattern generated by the beam 210 can be up to 60 degrees by 40 degrees optical, the scan pattern generated by the beam 212 can be up to 60 degrees by 40 degrees optical).

According to an example, it is contemplated that the scan patterns generated by the beams 208-212 can be raster scans. However, it is to be appreciated that other scan shapes, such as Lissajous or non-regular forms, can alternatively be used, provided that such shapes fit within an envelope of the field of view supported by the 2D MEMS mirror 102.

Now turning to FIG. 3, illustrated is another exemplary multiple beam, single mirror lidar system 300 according to various embodiments. The multiple beam, single mirror lidar system 300 includes the 2D MEMS mirror 102 and a photonic integrated circuit 302 (e.g., the photonic integrated circuit 104 of FIG. 1). The photonic integrated circuit 302 includes the lidar channels 106-108. Moreover, the photonic integrated circuit 302 includes a single light source 304 and a splitter 306.

The light source 304 is configured to generate an optical input. Moreover, the splitter 306 is configured to split the optical input for the lidar channels 106-108. Thus, in the embodiment shown in FIG. 3, a single light source (e.g., the light source 304) generates an optical input, which is then split by the splitter 306 for the lidar channels 106-108. The splitter 306, for example, can be formed by a plurality of multi-mode interference, evanescent coupling, or other photonic structures.

Various types of light sources are intended to fall within the scope of the hereto appended claims. For instance, the light source 304 can be a single laser diode source (e.g., a distributed feedback laser (DFB) source, a distributed Bragg reflector laser (DBR) source, a vertical-cavity surface-emitting laser (VCSEL) source). In the embodiment shown in FIG. 3, a number of elements of the multiple beam, single mirror lidar system 300 can be further reduced by utilizing a single light source (as compared to a lidar system that duplicates elements of a conventional 2D MEMS lidar system).

Although not shown, according to an example, it is contemplated that the laser source 304 can be optically coupled to a resonator, and the resonator can be optically coupled to the splitter 306. Following this example, the splitter 306 can be optically coupled to the transmitters of the lidar channels 106-108 (e.g., the splitter 306 can be optically coupled to optical amplifiers of the transmitters of the lidar channels 106-108).

Figure 4:
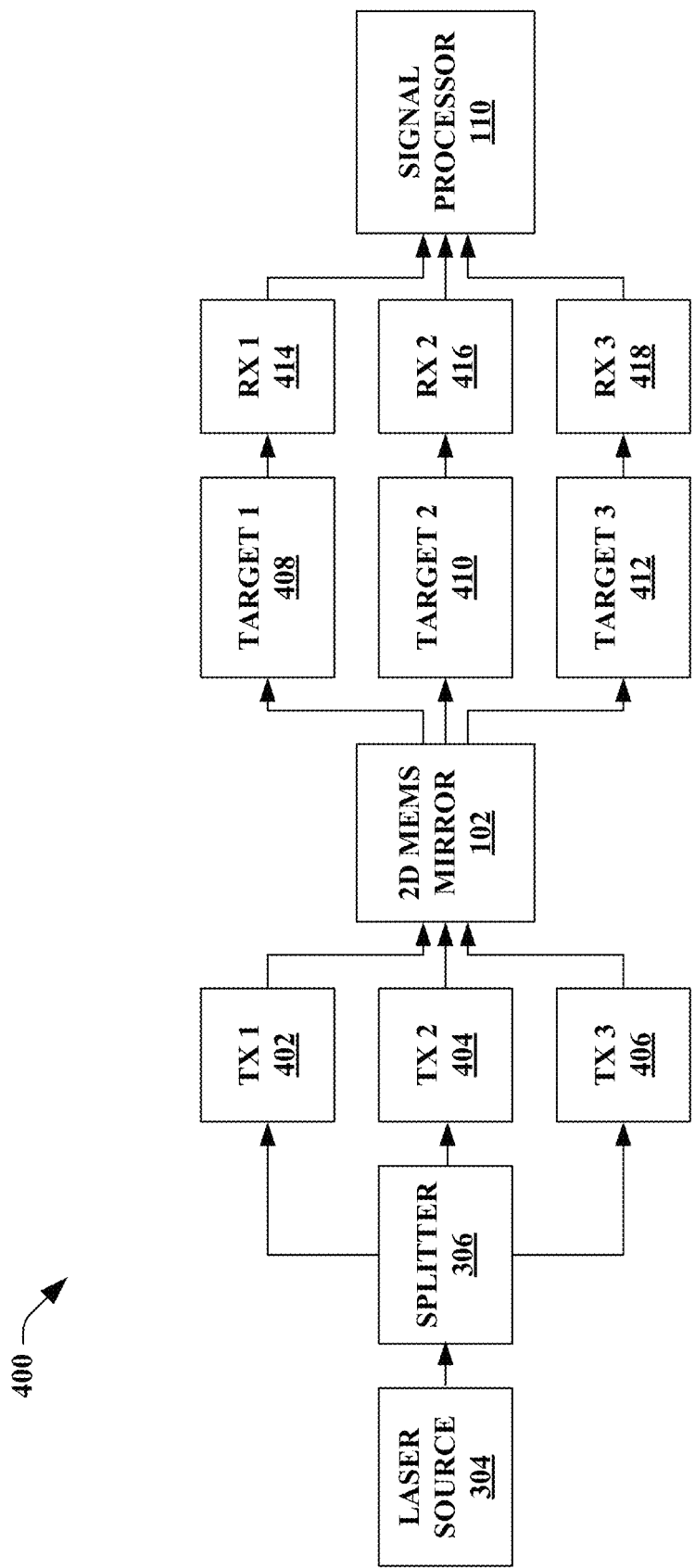
FIG. 4 illustrates an environment that includes the multiple beam, single mirror lidar system of FIG. 3.

Now turning to FIG. 4, illustrated is an environment 400 that includes a multiple beam, single mirror lidar system (e.g., the multiple beam, single mirror lidar system 300 of FIG. 3). As depicted in FIG. 4, the multiple beam, single mirror lidar system includes a single laser source (e.g., the laser source 304), the splitter 306, three lidar channels, the 2D MEMS mirror 102, and the signal processor 110. The first lidar channel includes a transmitter 1 402 and a receiver 1 414, the second lidar channel includes a transmitter 2 404 and a receiver 2 416, and the third lidar channel includes a transmitter 3 406 and a receiver 3 418.

In the depicted example of FIG. 4, the laser source 304 can generate an optical input, which is inputted to the splitter 306. The splitter 306 can split the optical input for the transmitter 1 402, the transmitter 2 404, and the transmitter 3 406. The transmitter 1 402, the transmitter 2 404, and the transmitter 3 406 can output beams directed towards the common point on the 2D MEMS mirror 102. The beams can be incident upon the 2D MEMS mirror 102 and can reflect off of the 2D MEMS mirror 102. As described herein, the beams can be incident on the 2D MEMS mirror 102 with respective offset angles.

The beams that reflect off of the 2D MEMS mirror 102 are directed into the environment 400 according to the scan patterns (e.g., based on the mechanical tilt of the 2D MEMS mirror 102). If the beams are incident upon target(s) located in the environment 400, then the beams can reflect off such target(s). In the depicted example, the beam outputted by the transmitter 1 402 reflects off of a target 1 408, the beam outputted by the transmitter 2 404 reflects off of a target 2 410, and the beam outputted by the transmitter 3 406 reflects off of a target 3 412. Although not shown, it is contemplated that lidar returns received by the multiple beam, single mirror lidar system can reflect off of the 2D MEMS mirror 102 and be directed towards the receivers 414-416. The receiver 1 414 can receive the lidar return from the target 1 408, the receiver 2 416 can receive the lidar return from the target 2 410, and the receiver 3 418 can receive the lidar return from the target 3 412. The receivers 414-418 can convert the lidar returns into electrical signals. Moreover, the signals outputted by the receivers 414-418 can be provided to the signal processor 110 to determine distances to the targets 414-418. Accordingly, the lidar returns for the beams that follow the scan patterns can be evaluated by the signal processor 110 to output a point cloud (e.g., including distances to the targets 408-412, velocity of the targets 408-412).

As described herein, the beams outputted from the multiple beam, single mirror lidar system can traverse the environment 400 according to the scan patterns. Accordingly, if a beam is reflected by a target in the environment 400, a lidar return can be received by the multiple beam, single mirror lidar system. Thus, the targets 408-412 can reflect light transmitted by the transmitters 402-406, and the reflected light (the lidar returns) can be converted to electrical signals by the receiver 414-418. Moreover, it is to be appreciated that the targets 408-412 can be the same target or differing targets (e.g., a common object can reflect more than one beam). Further, it is contemplated that a target may not be within range of the multiple beam, single mirror lidar system at various points within the scan patterns.

Figure 5:
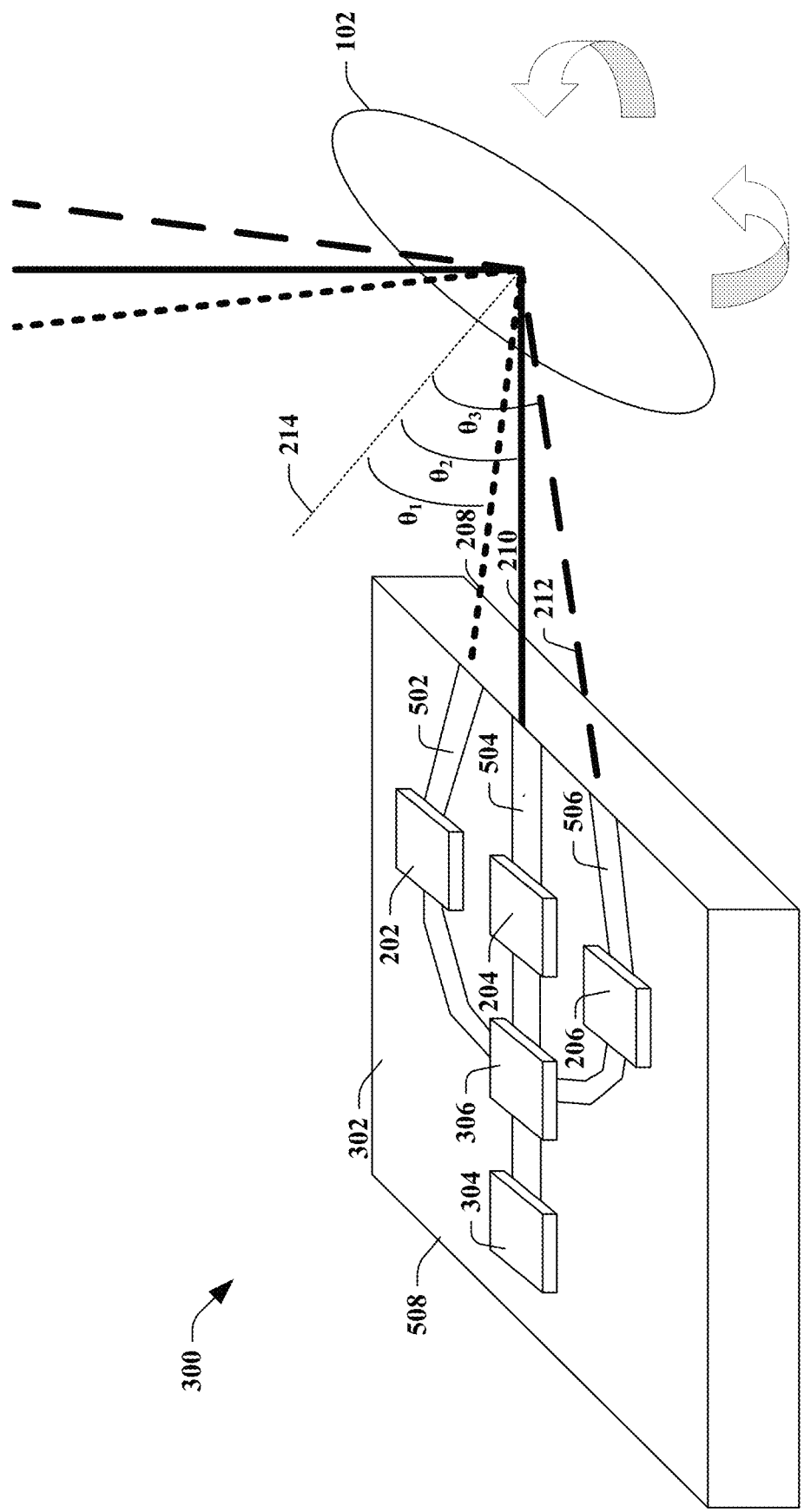
FIG. 5 illustrates the multiple beam, single mirror lidar system of FIG. 3, according to various embodiments.

Now turning to FIG. 5, illustrated is another illustration of the multiple beam, single mirror lidar system 300. The multiple beam, single mirror lidar system 300 includes the 2D MEMS mirror 102 and the photonic integrated circuit 302. The photonic integrated circuit 300 depicted in FIG. 5 includes the single laser source 304, the splitter 306, and three lidar channels (e.g., the lidar channel 202, the lidar channel 204, and the lidar channel 206 of FIG. 2); laser source 304, the splitter 306, and the lidar channels 202-206 are integrated on a monolithic substrate 508. Again, the transmitter of the lidar channel 202 outputs the beam 208, the transmitter of the lidar channel 204 outputs the beam 210, and the transmitter of the lidar channel 206 outputs the beam 212.

The photonic integrated circuit 302 shown in FIG. 5 further includes a plurality of waveguides. Thus, the waveguides can be integrated on the monolithic substrate 508 of the photonic integrated circuit 302. A first waveguide 502 can be configured to guide the beam 208 from the transmitter of the lidar channel 202 directed towards the common point on the 2D MEMS mirror 102. Moreover, a second waveguide 504 can be configured to guide the beam 210 from the transmitter of the lidar channel 204 directed towards the common point on the 2D MEMS mirror 102. Further, a third waveguide 506 can be configured to guide the beam 212 from the transmitter of the lidar channel 206 directed towards the common point on the 2D MEMS mirror 102. While one waveguide is described as being configured to guide a beam from a transmitter directed towards the common point on the 2D MEMS mirror 102, it is contemplated that a set of waveguides can instead be utilized (e.g., the first waveguide 502 can be a set of waveguides configured to guide the beam 208 from the transmitter of the lidar channel 202 directed towards the common point on the 2D MEMS mirror 102). The beams 208-212 can be outputted from the waveguides 502-506 such that the beams 208-212 are incident on the 2D MEMS mirror 102 at the common point with the relative offset angles.

According to an example, the waveguides 502-506 can each terminate with a structure designed to couple light (e.g., the beams 208-212) from the photonic integrated circuit 302 to free-space. Following this example, it is contemplated that the structures can include edge couplers, tapers, grating couplers, and the like. Moreover, pursuant to an example, the waveguides 502-506 can be formed by a material, such as silicon (Si), silicon dioxide (SiO2), silicon nitride (Si3N4), gallium arsenide (GaAs), indium phosphide (InP), lithium nitrate (LiNO3), or the like, on a substrate material (the monolithic substrate 508), such as Si, GaAs, InP, etc.

The orientation of the waveguides 502-506 can provide the angles $\theta_1$, $\theta_2$, and $\theta_3$ for the lidar channels 202-206. However, it is to be appreciated that in another embodiment, the photonic integrated circuit 302 can have waveguides that exit the photonic integrated circuit 302 in a substantially parallel fashion (or some other orientation). For instance, external mirrors (e.g., external to the photonic integrated circuit 302) or other such discrete optical elements may be utilized to direct the beams from such waveguides to the common point on the 2D MEMS mirror 102 with the relative offset angles.

Referring now to FIG. 6, illustrated is another exemplary multiple beam, single mirror lidar system 600. The multiple beam, single mirror lidar system 600 includes the 2D MEMS mirror 102 and a photonic integrated circuit 602 (e.g., the photonic integrated circuit 104 of FIG. 1). The photonic integrated circuit 602 includes the lidar channels 106-108. Moreover, the photonic integrated circuit 602 includes multiple laser sources; in particular, the photonic integrated circuit 602 includes a laser source 1 604, . . . , and a laser source M 606 (collectively referred to herein as laser sources 604-606). In the example shown in FIG. 6, each of the laser sources 604-606 is configured to generate an optical input for a corresponding lidar channel (e.g., the laser source 1 604 is configured to generate a first optical input for the lidar channel 1 106 and the laser source M 606 is configured to generate a second optical input for the lidar channel M 108).

Figure 7:
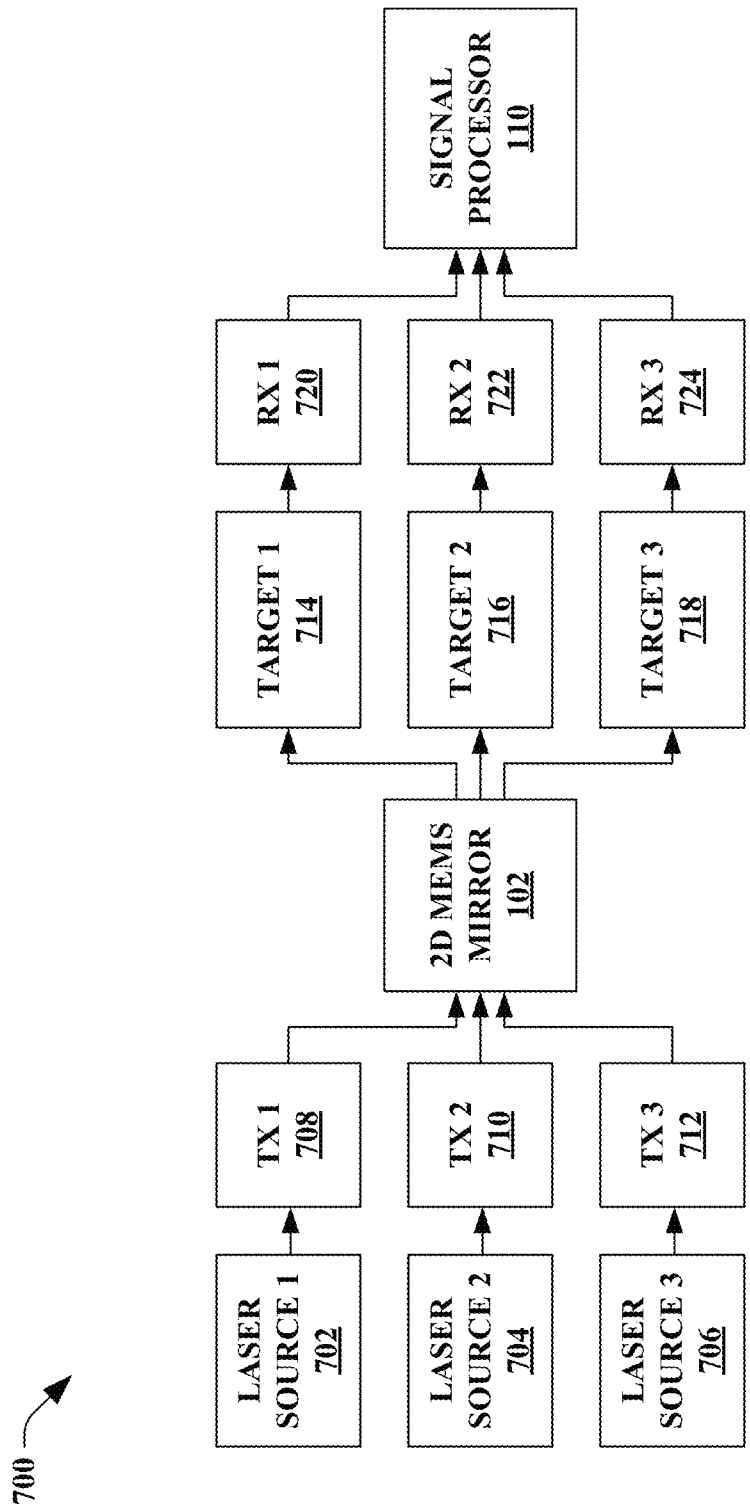
FIG. 7 illustrates an environment that includes the multiple beam, single mirror lidar system of FIG. 6.

With reference to FIG. 7, illustrated is an environment 700 that includes a multiple beam, single mirror lidar system (e.g., the multiple beam, single mirror lidar system 600 of FIG. 6). As depicted in FIG. 7, the multiple beam, single mirror lidar system includes three laser sources (e.g., a laser source 1 702, a laser source 2 704, and a laser source 3 706), three lidar channels, the 2D MEMS mirror 102, and the signal processor 110. Similar to FIG. 4, the first lidar channel includes a transmitter 1 708 and a receiver 1 720, the second lidar channel includes a transmitter 2 710 and a receiver 2 722, and the third lidar channel includes a transmitter 3 712 and a receiver 3 724.

In the environment 700, the laser source 1 702 generate a first optical input for the transmitter 1 708, the laser source 2 704 generates a second optical input for the transmitter 2 710, and the laser source 3 706 generates a third optical input for the transmitter 3 712. Moreover, similar to above with respect to FIG. 4, the transmitters 708-712 can output beams directed towards the common point on the 2D MEMS mirror 102. Further, the beams can be incident upon the 2D MEMS mirror 102 and can reflect off of the 2D MEMS mirror 102 (with respective offset angles as described herein).

Again, the beams that reflect off of the 2D MEMS mirror 102 are directed into the environment 700 according to the scan patterns (e.g., based on the mechanical tilt of the 2D MEMS mirror 102). If the beams are incident upon target(s) located in the environment 700, then the beams can reflect off such target(s). In the depicted example, the beam outputted by the transmitter 1 708 reflects off of a target 1 714, the beam outputted by the transmitter 2 710 reflects off of a target 2 716, and the beam outputted by the transmitter 3 712 reflects off of a target 3 718. Although not shown, it is contemplated that lidar returns received by the multiple beam, single mirror lidar system can reflect off of the 2D MEMS mirror 102 and be directed towards the receivers 720-724. The receiver 1 722 can receive the lidar return from the target 1 714, the receiver 2 722 can receive the lidar return from the target 2 716, and the receiver 3 724 can receive the lidar return from the target 3 718. The receivers 720-724 can convert the lidar returns into electrical signals. Moreover, the signals outputted by the receivers 720-724 can be provided to the signal processor 110 to determine distances to the targets 714-718. Accordingly, the lidar returns for the beams that follow the scan patterns can be evaluated by the signal processor 110 to output a point cloud (e.g., including distances to the targets 714-718, velocity of the targets 714-718).

Similar to above, the beams outputted from the multiple beam, single mirror lidar system can traverse the environment 700 according to the scan patterns. Accordingly, if a beam is reflected by a target in the environment 700, a lidar return can be received by the multiple beam, single mirror lidar system. Thus, the targets 714-718 can reflect light transmitted by the transmitters 708-712, and the reflected light (the lidar returns) can be converted to electrical signals by the receiver 720-724. Moreover, it is to be appreciated that the targets 714-718 can be the same target or differing targets (e.g., a common object can reflect more than one beam). Further, it is contemplated that a target may not be within range of the multiple beam, single mirror lidar system at various points within the scan patterns.

Figure 8:
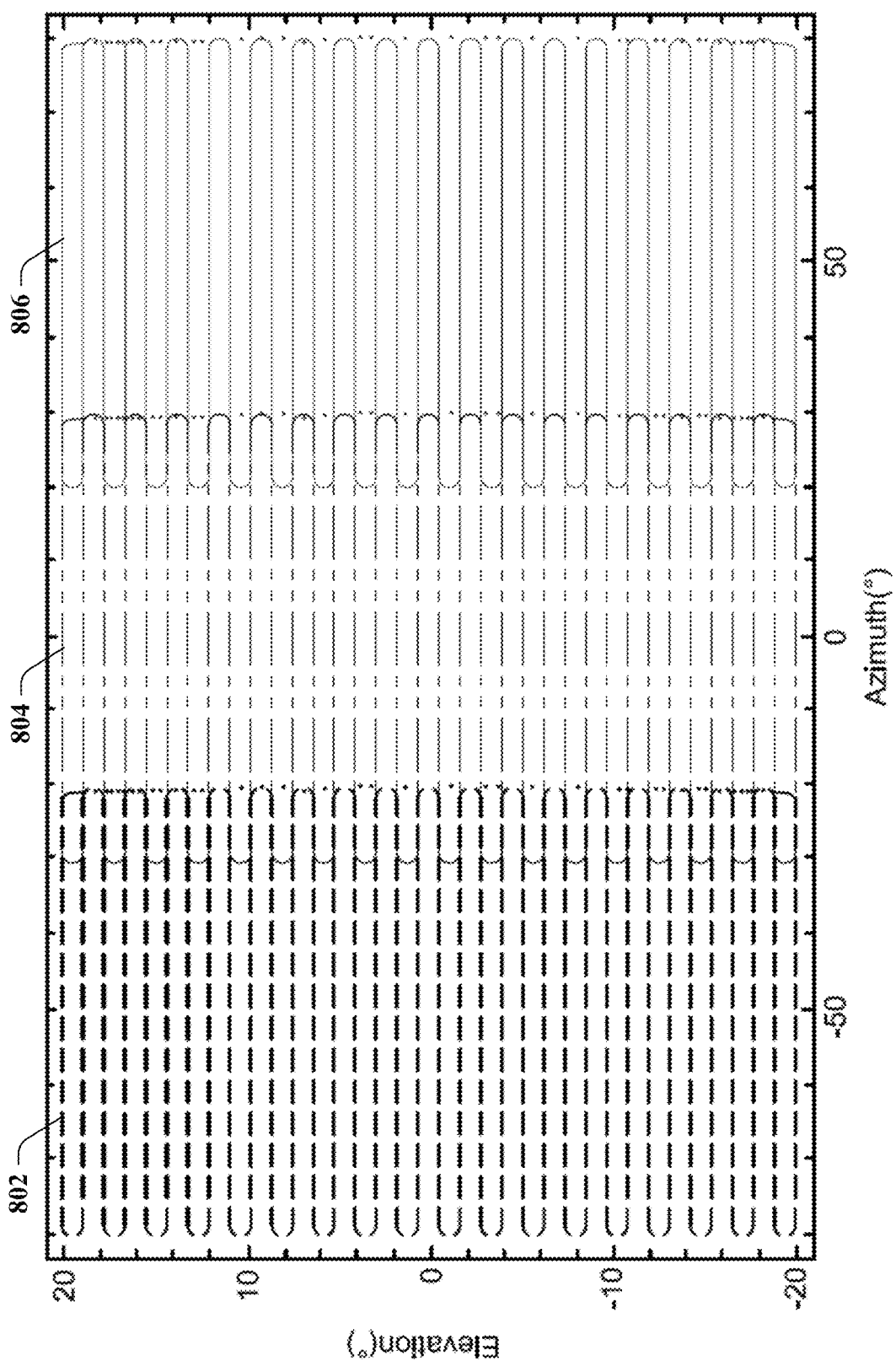
FIGS. 8-12 illustrate various exemplary scan patterns for a multiple beam, single mirror lidar system.

Now referring to FIGS. 8-12, illustrated are various exemplary scan patterns for a multiple beam, single mirror lidar system (e.g., the multiple beam, single mirror lidar system 100, 200, 300, or 600). As shown in FIG. 8, hardware of a multiple beam, single mirror lidar system can be configured such that the relative offset angles abs($\theta_2-\theta_1$) and abs($\theta_3-\theta_2$) are equal to 50 degrees optical in the horizontal direction (azimuthal direction). A first scan pattern 802 is generated by a first transmitter of a first lidar channel (e.g., the lidar channel 202), a second scan pattern 804 is generated by a second transmitter of a second lidar channel (e.g., the lidar channel 204), and a third scan pattern 806 generated by a third transmitter of a third lidar channel (e.g., the lidar channel 206). The scan pattern 802 and the scan pattern 804 overlap each other by 10 degrees in the horizontal direction. Likewise, the scan pattern 804 and the scan pattern 806 overlap each other by 10 degrees in the horizontal direction. Thus, a total scan pattern shown in FIG. 8 for a multiple beam, single mirror lidar system that includes the three lidar channels covers a field of view of 160 degrees by 40 degrees. The total scan pattern is a combination of the scan pattern 802, the scan pattern 804, and the scan pattern 806. Accordingly, if utilized in an autonomous vehicle, 360 degree azimuthal coverage can be provided by utilizing three such multiple beam, single mirror lidar systems (as opposed to using at least six conventional lidar systems each having a field of view of 60 degrees by 40 degrees).

Figure 9:
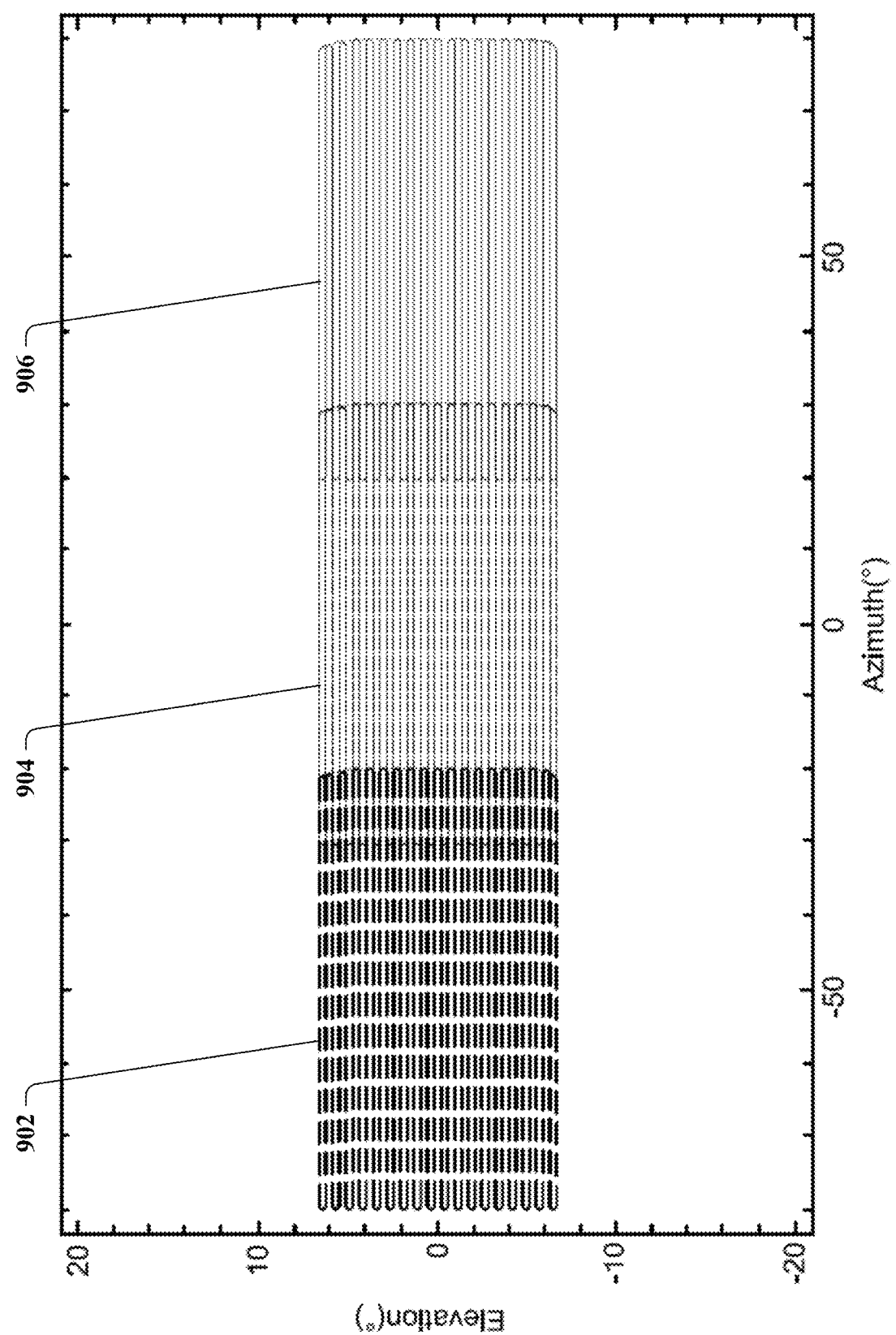
Figure 10:
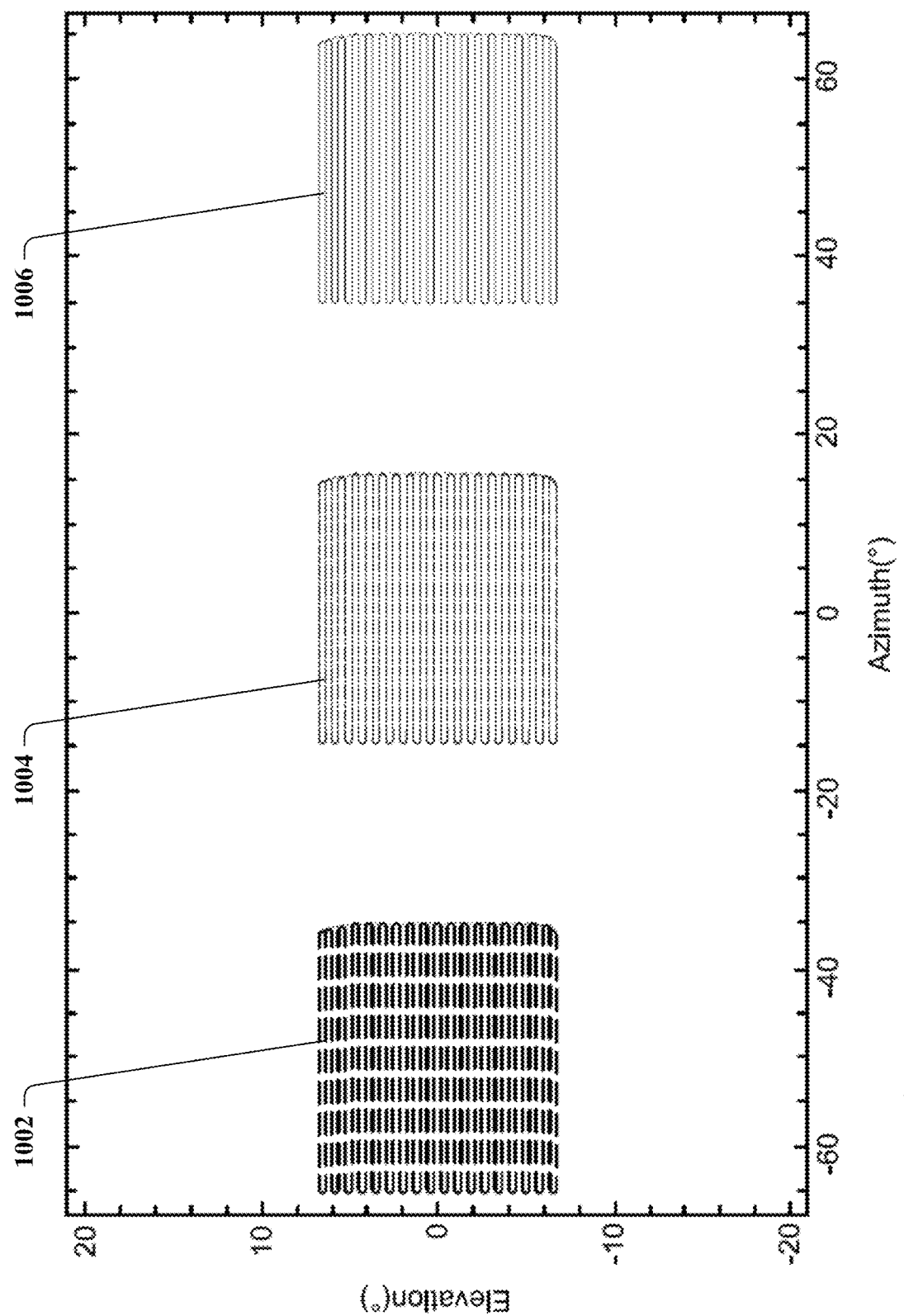

FIGS. 9 and 10 depict scan patterns generated from the same hardware configuration as in FIG. 8 (e.g., the relative offset angles abs($\theta_2-\theta_1$) and abs($\theta_3-\theta_2$) are equal to 50 degrees optical in the horizontal direction (azimuthal direction)). To obtain the scan patterns 902, 904, and 906 shown in FIG. 9, a 2D MEMS mirror of the multiple beam, single mirror lidar system (e.g., the 2D MEMS mirror 102) can be tilted in the elevation direction up to ⅓ $y_{max}$ and in the azimuthal direction up to $x_{max}$ (e.g., as controlled by the controller 112 of FIG. 1). To obtain the scan patterns 1002, 1004, and 1006 shown in FIG. 10, a 2D MEMS mirror of the multiple beam, single mirror lidar system (e.g., the 2D MEMS mirror 102) can be tilted in the elevation direction up to ⅓ $y_{max}$ and in the azimuthal direction up to ½ $x_{max}$ (e.g., as controlled by the controller 112 of FIG. 1).

Accordingly, the overall scan patterns depicted in FIGS. 8, 9, and 10 are obtained by changing the mechanical tilt of the 2D MEMS mirror (e.g., as controlled by the controller 112, in software). No hardware change for the multiple beam, single mirror lidar system is needed to obtain the differing overall scan patterns shown in FIGS. 8, 9, and 10. Accordingly, overall scan patterns for the multiple beam, single mirror lidar system can be changed over time, for example, in response to changing environmental conditions, a command from an autonomous vehicle, a command from a user, or the like.

The vertical angular resolution for the overall scan patterns in FIGS. 9 and 10 can be three times the vertical angular resolution for the overall scan pattern in FIG. 8. Further, the horizontal resolution for the overall scan pattern in FIG. 10 can be two times the horizontal resolution of the scan patterns in FIGS. 8 and 9 (within the field of coverage). Accordingly, the techniques described herein enable the ability to dynamically modify resolution while improving total field of view coverage per lidar system.

Figure 11:
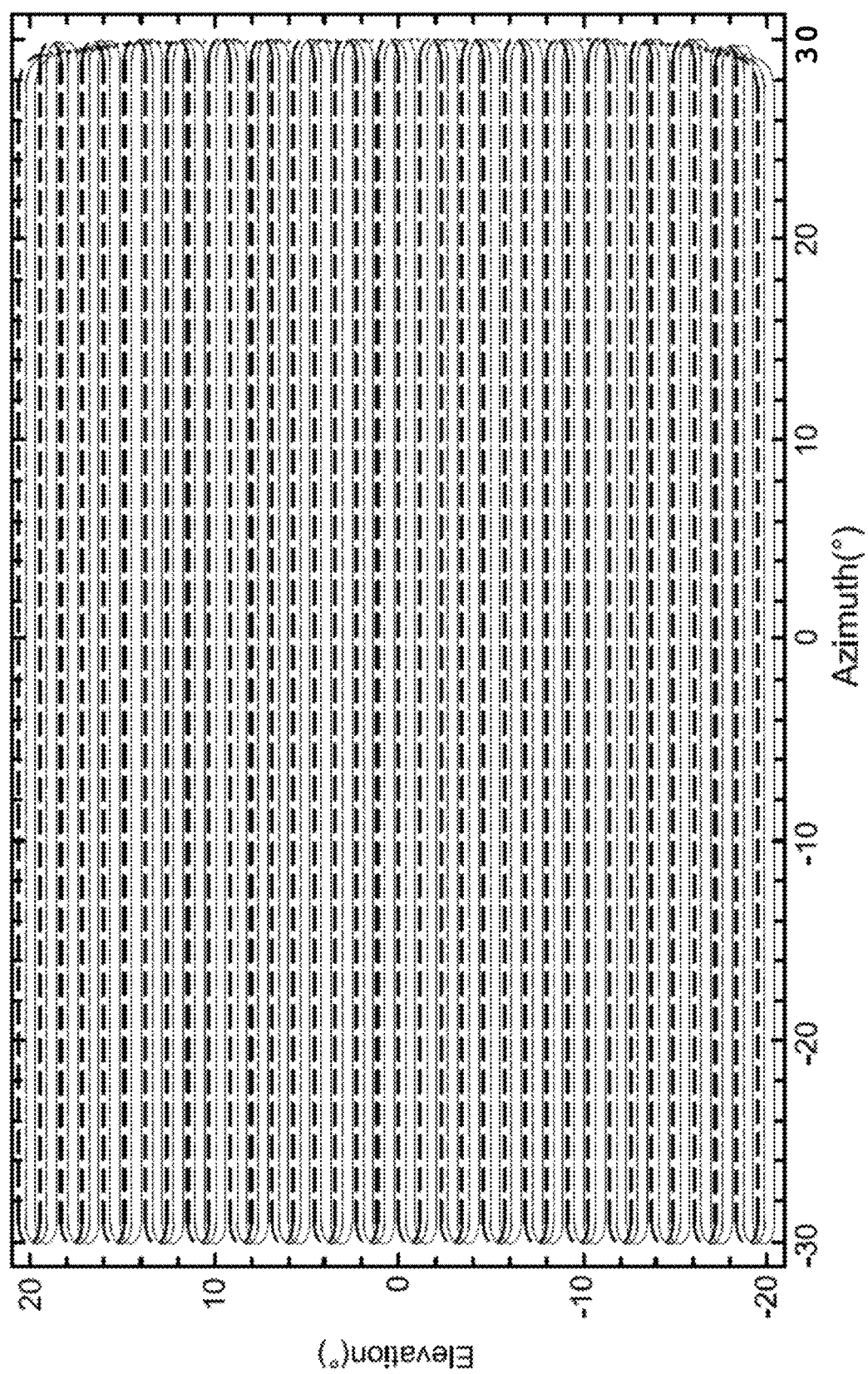

Turning to FIG. 11, depicted is an overall scan pattern generated by a multiple beam, single mirror lidar system, where the relative offset angles are 0.4 degrees in the elevation direction. In the example shown in FIG. 11, a field of view is 60 degrees in the azimuthal direction by 40 degrees in the elevation direction (which can be the same as a conventional MEMS actuated lidar system). However, as shown in the example of FIG. 11, the total angular resolution in the elevation direction can be improved by a factor of three.

Figure 12:
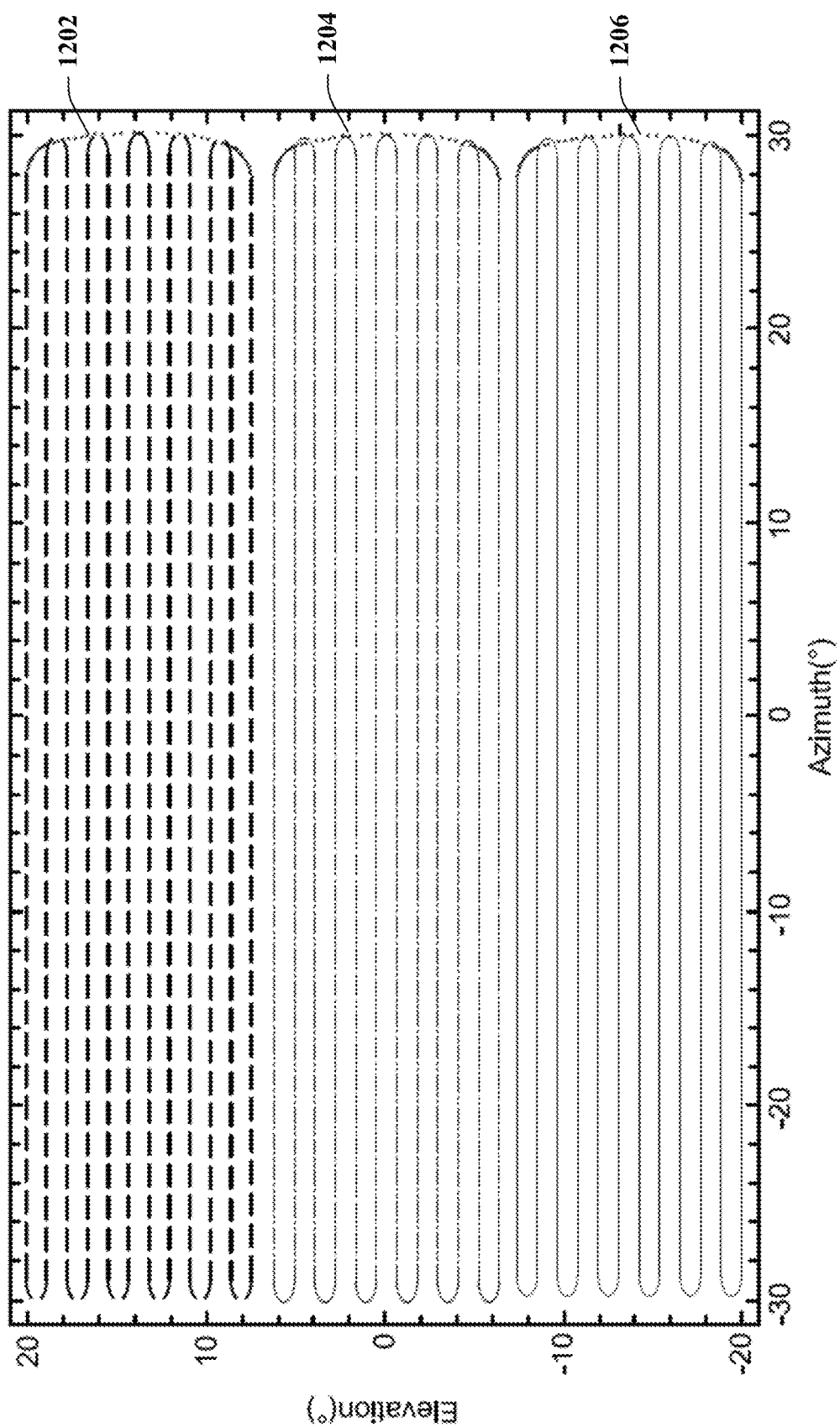

Referring now to FIG. 12, depicted is an overall scan pattern generated by a multiple beam, single mirror lidar system, where the relative offsets are 13.33 degrees in the elevation direction and the mirror tilt is limited to ⅓ $y_{max}$. Again, in the example shown in FIG. 12, a field of view is 60 degrees in the azimuthal direction by 40 degrees in the elevation direction (which can be the same as a conventional MEMS actuated lidar system). However, a scan pattern 1202, a scan pattern 1204, and a scan pattern 1206 can each take ⅓ of the time of a single laser sweeping the entire field of view. Thus, a data collection rate and a frame rate of a multiple beam, single mirror lidar system as configured in this example can be three times higher than that of a conventional lidar system.

Figure 13:
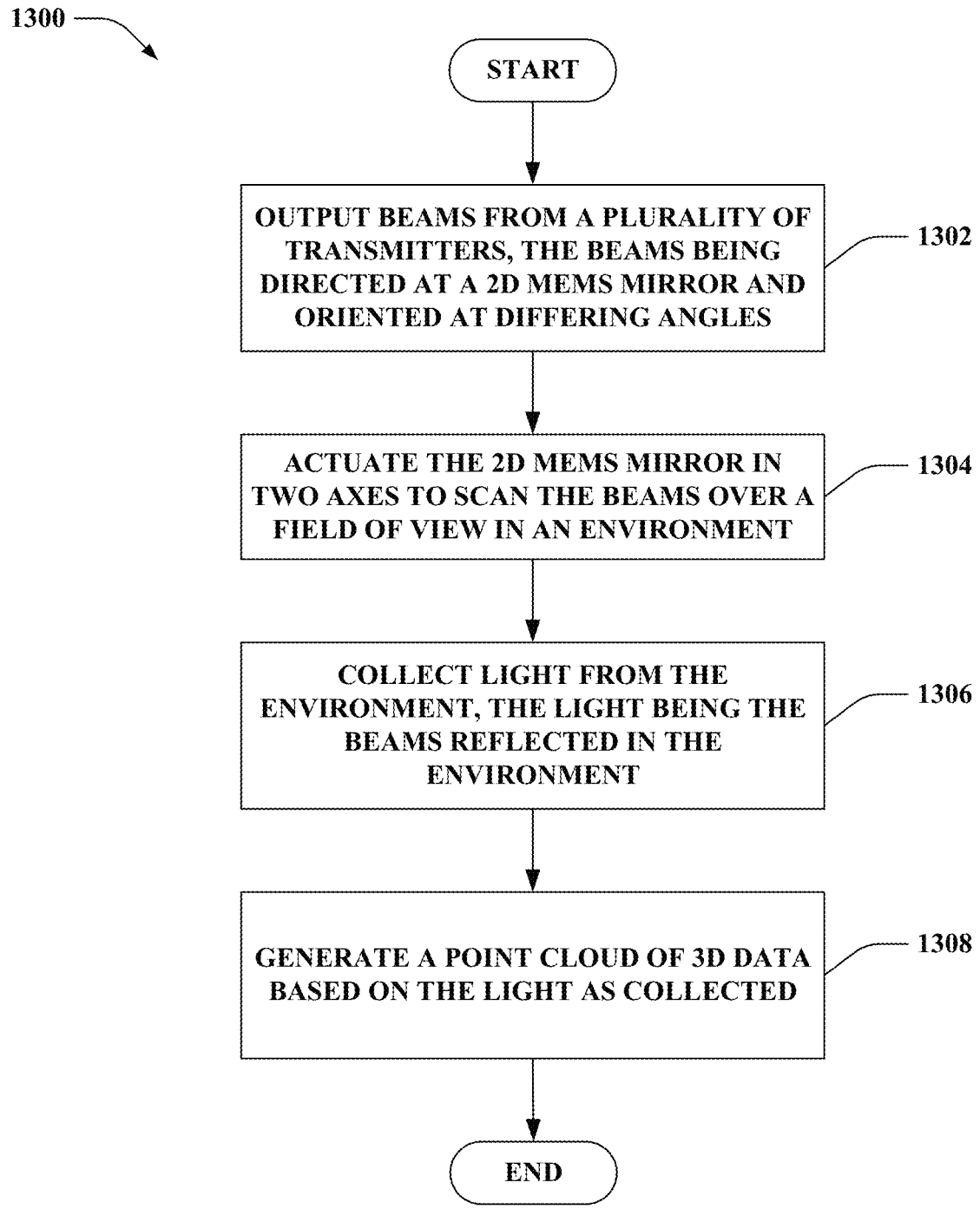
FIG. 13 is a flow diagram that illustrates an exemplary methodology performed by a multiple beam, single mirror lidar system.

FIG. 13 illustrates an exemplary methodology relating to operating a multiple beam, single mirror lidar system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

FIG. 13 illustrates a methodology 1300 performed by a multiple beam, single mirror lidar system. At 1302, beams from a plurality of transmitters of the multiple beam, single mirror lidar system can be outputted. The beams can be directed at a 2D MEMS mirror of the multiple beam, single mirror lidar system. Further, the beams can be oriented at differing angles. At 1304, the 2D MEMS mirror can be actuated in two axes to scan the beams over a field of view in an environment. At 1306, light can be collected from the environment. The light can be the beams reflected in the environment (e.g., lidar returns from the beams reflecting off of target(s) in the environment). At 1308, a point cloud of 3D data can be generated based on the light as collected.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A multiple beam, single mirror lidar system, comprising:
   a two-dimensional (2D) micro-electro-mechanical systems (MEMS) mirror; and
   a photonic integrated circuit, comprising:
      a first lidar channel, the first lidar channel comprises a first transmitter and a first receiver; and
      a second lidar channel, the second lidar channel comprises a second transmitter and a second receiver;
      wherein the first lidar channel and the second lidar channel are directed at a common point on the 2D MEMS mirror and are oriented with a relative offset angle.

2. The multiple beam, single mirror lidar system of claim 1, the photonic integrated circuit further comprises:
   a first waveguide, wherein the first waveguide is configured to guide a first beam from the first transmitter directed towards the common point on the 2D MEMS mirror and to guide a first return beam from the 2D MEMS mirror to the first receiver; and
   a second waveguide, wherein the second waveguide is configured to guide a second beam from the second transmitter directed towards the common point on the 2D MEMS mirror and to guide a second return beam from the 2D MEMS mirror to the second receiver;
   wherein the first beam and the second beam are incident on the 2D MEMS mirror at the common point with the relative offset angle.

3. The multiple beam, single mirror lidar system of claim 1, wherein the relative offset angle is fixed.

4. The multiple beam, single mirror lidar system of claim 1, the photonic integrated circuit further comprises:
   a single laser source, the single laser source is configured to generate an optical input; and
   a splitter, the splitter is configured to split the optical input for the first lidar channel and the second lidar channel.

5. The multiple beam, single mirror lidar system of claim 1, the photonic integrated circuit further comprises:
   a first laser source, the first laser source is configured to generate a first optical input for the first lidar channel; and
   a second laser source, the second laser source is configured to generate a second optical input for the second lidar channel.

6. The multiple beam, single mirror lidar system of claim 1, the photonic integrated circuit further comprises a direct time-of-flight (TOF) laser source.

7. The multiple beam, single mirror lidar system of claim 1, the photonic integrated circuit further comprises a frequency-modulated continuous wavelength (FMCW) laser source.

8. The multiple beam, single mirror lidar system of claim 1, wherein:
   the 2D MEMS mirror is actuatable to mechanically tilt in both an azimuthal direction and an elevation direction such that a first beam from the first transmitter that reflects off of the 2D MEMS mirror forms a first scan pattern and a second beam from the second transmitter that reflects off of the 2D MEMS mirror forms a second scan pattern; and
   the first scan pattern and the second scan pattern are shifted with respect to each other based on the relative offset angle.

9. The multiple beam, single mirror lidar system of claim 8, wherein at least portions of the first scan pattern and the second scan pattern are non-overlapping.

10. The multiple beam, single mirror lidar system of claim 8, wherein at least portions of the first scan pattern and the second scan pattern are overlapping.

11. The multiple beam, single mirror lidar system of claim 1, the photonic integrated circuit further comprises:
    a third lidar channel, the third lidar channel comprises a third transmitter and a third receiver;
    wherein the third lidar channel is directed at the common point on the 2D MEMS mirror, and the second lidar channel and the third lidar channel are oriented with a second relative offset angle.

12. The multiple beam, single mirror lidar system of claim 1, wherein the relative offset angle is between 0 degrees and 30 degrees mechanical.

13. A photonic integrated circuit, comprising:
    a first lidar channel, the first lidar channel comprises a first transmitter and a first receiver; and
    a second lidar channel, the second lidar channel comprises a second transmitter and a second receiver;
    wherein the first lidar channel and the second lidar channel are directed at a common point on a two-dimensional (2D) micro-electro-mechanical systems (MEMS) mirror and are oriented with a relative offset angle.

14. The photonic integrated circuit of claim 13, further comprising:
    a first waveguide, wherein the first waveguide is configured to guide a first beam from the first transmitter directed towards the common point and to guide a first return beam from the common point to the first receiver; and a second waveguide, wherein the second waveguide is configured to guide a second beam from the second transmitter directed towards the common point and to guide a second return beam from the common point to the second receiver.

15. The photonic integrated circuit of claim 13, further comprising:
a single laser source, the single laser source is configured to generate an optical input; and
a splitter, the splitter is configured to split the optical input for the first lidar channel and the second lidar channel.

16. The photonic integrated circuit of claim 13, further comprising:
a first laser source, the first laser source is configured to generate a first optical input for the first lidar channel; and
a second laser source, the second laser source is configured to generate a second optical input for the second lidar channel.

17. The photonic integrated circuit of claim 13, wherein the relative offset angle is between 0 degrees and 30 degrees mechanical.

18. A multiple beam, single mirror lidar system, comprising:
a two-dimensional (2D) micro-electro-mechanical systems (MEMS) mirror; and
a photonic integrated circuit, comprising:
a first lidar channel configured to output a first beam; and
a second lidar channel configured to output a second beam;
wherein the first beam and the second beam are directed at a common point on the 2D MEMS mirror and are oriented with a relative offset angle.

19. The multiple beam, single mirror lidar system of claim 18, wherein:
the 2D MEMS mirror is actuatable to mechanically tilt in both an azimuthal direction and an elevation direction such that the first beam reflects off of the 2D MEMS mirror to form a first scan pattern and the second beam reflects off of the 2D MEMS mirror to form a second scan pattern;
the first scan pattern and the second scan pattern are shifted with respect to each other based on the relative offset angle; and
at least portions of the first scan pattern and the second scan pattern are non-overlapping.

20. The multiple beam, single mirror lidar system of claim 18, wherein:
the 2D MEMS mirror is actuatable to mechanically tilt in both an azimuthal direction and an elevation direction such that the first beam reflects off of the 2D MEMS mirror to form a first scan pattern and the second beam reflects off of the 2D MEMS mirror to form a second scan pattern;
the first scan pattern and the second scan pattern are shifted with respect to each other based on the relative offset angle; and
at least portions of the first scan pattern and the second scan pattern are overlapping.

* * * * *